US012116951B2

(12) United States Patent
Tamaki et al.

(10) Patent No.: US 12,116,951 B2
(45) Date of Patent: Oct. 15, 2024

(54) CYLINDER LINER AND CYLINDER BORE

(71) Applicants: TPR Co., Ltd., Tokyo (JP); TPR Industry Co., Ltd., Yamagata (JP)

(72) Inventors: Seiji Tamaki, Tokyo (JP); Takashi Oizumi, Yamagata (JP)

(73) Assignees: TPR Co., Ltd., Tokyo (JP); TPR Industry Co., Ltd., Yamagata (JP)

( * ) Notice: Subject to any disclaimer, the term of this patent is extended or adjusted under 35 U.S.C. 154(b) by 0 days.

(21) Appl. No.: 17/926,715

(22) PCT Filed: Jun. 11, 2020

(86) PCT No.: PCT/JP2020/023058
§ 371 (c)(1),
(2) Date: Nov. 21, 2022

(87) PCT Pub. No.: WO2021/250859
PCT Pub. Date: Dec. 16, 2021

(65) Prior Publication Data

US 2023/0193847 A1 Jun. 22, 2023

(51) Int. Cl.
*F02F 1/00* (2006.01)
*F02F 1/20* (2006.01)

(52) U.S. Cl.
CPC ................ *F02F 1/004* (2013.01); *F02F 1/20* (2013.01)

(58) Field of Classification Search
CPC ...... F02F 1/004; F02F 1/20; F02F 5/00; F02F 11/00; F02F 2200/06; F16J 10/04; F16J 9/06; F16J 9/20
See application file for complete search history.

(56) References Cited

U.S. PATENT DOCUMENTS

| | | | | |
|---|---|---|---|---|
| 9,581,103 | B1 * | 2/2017 | Qin | C22C 38/16 |
| 9,915,220 | B2 * | 3/2018 | Meirelles Tomanik | F02F 1/20 |
| 10,294,885 | B2 * | 5/2019 | Bettini Rabello | F02F 1/004 |
| 2006/0113730 | A1 * | 6/2006 | Suzuki | F16J 9/062 277/434 |
| 2010/0288222 | A1 * | 11/2010 | Urabe | F16J 10/04 123/193.2 |

(Continued)

FOREIGN PATENT DOCUMENTS

| | | | | |
|---|---|---|---|---|
| BR | 102016006242 | A2 * | 9/2017 | B24B 1/005 |
| JP | 2002-364455 | A | 12/2002 | |

(Continued)

OTHER PUBLICATIONS

Search Report in International Application No. PCT/JP2020/023058 dated Aug. 25, 2020, 2 pages.

*Primary Examiner* — Grant Moubry
(74) *Attorney, Agent, or Firm* — MARSHALL, GERSTEIN & BORUN LLP

(57) ABSTRACT

Provided is a cylinder liner which can reduce the friction of the sliding surface from conventional levels and improve fuel efficiency without increasing oil consumption from conventional levels.
When the inner circumferential surface of a cylinder liner or cylinder bore used in an internal combustion engine has a first sliding region, a second sliding region, and a third sliding region, and when respective surface roughness Rvk is from 0.05 μm to 0.3 μm, from 0.4 μm to 1.5 μm, and from 0.15 μm to 0.7 μm, a friction can be reduced while maintaining oil consumption.

18 Claims, 6 Drawing Sheets

(56) References Cited

U.S. PATENT DOCUMENTS

| | | | | |
|---|---|---|---|---|
| 2016/0153392 | A1 | 6/2016 | Meirelles Tomanik | |
| 2017/0167430 | A1 | 6/2017 | Bettini Rabello et al. | |
| 2020/0256277 | A1* | 8/2020 | Kawai | F16J 10/00 |

FOREIGN PATENT DOCUMENTS

| | | | |
|---|---|---|---|
| JP | 2014-062490 | A | 4/2014 |
| JP | 2017-110804 | A | 6/2017 |
| JP | 2019-078267 | A | 5/2019 |
| WO | WO-2004/090318 | A1 | 10/2004 |

* cited by examiner

CYLINDER LINER AND CYLINDER BORE

TECHNICAL FIELD

The present invention relates to a cylinder liner and a cylinder bore used in an internal combustion engine, and a combination of the cylinder liner or the cylinder bore and a piston with a piston ring.

BACKGROUND OF THE INVENTION

The inner circumferential surface of a cylinder liner (cylinder bore) is finely machined with grooves or the like to reduce friction when sliding with a piston. In addition, to further reduce friction and improve scuffing resistance, it has been proposed that micromachining of grooves on the inner circumferential surface of a cylinder liner is varied in the axial direction of the cylinder liner.

For example, Patent Literature 1 discloses that the surface roughness of a bore inner circumferential surface head region from the crank angle of 0 degrees at the position where the top ring of a piston ring sliding along the bore inner circumferential surface is at its top dead center to the crank angle of around 20 degrees is larger than the surface roughness of the base region at the base from the head region. It is disclosed that, as a result, an engine can hold a large amount of oil in a region where friction loss and scuffing resistance need to be increased the most, thereby reducing oil consumption and suppressing generation of HC volume or the like.

Patent Literature 2 discloses a cylinder liner in which the inner circumferential surface is divided along the axial direction of the cylinder liner into three portions (Z1, Z2, Z3): a first portion (Z1) near the piston top dead center, a second portion (Z2) in the center, and a third portion (Z3) near the piston bottom dead center, each of the three portions (Z1, Z2, Z3) having a specific roughness value and a predetermined length. It is also disclosed that the roughness Rvk of the first portion (Z1) is from 1.10 to 2.80 μm, the roughness Rvk of the second portion (Z2) is from 0.30 to 1.00 μm, and the roughness Rvk of the third portion (Z3) is from 0.30 to 2.80 μm.

Furthermore, Patent Literature 3 discloses a cylinder of an internal combustion engine, the inner wall surface of which is divided into an upper region, a lower region, and a central region, and the surface roughness of the central region is greater than that of the upper region and the lower region.

CITATION LIST

Patent Literature

Patent Literature 1 JP 2002-364455 A
Patent Literature 2 JP 2017-110804 A
Patent Literature 3 JP 2019-78267 A

SUMMARY OF INVENTION

Technical Problem

The above-described disclosed methods provide general directions for improving fuel efficiency and reducing oil consumption. However, the scope of the disclosure is very broad, and specific numerical values are not disclosed, resulting in inadequate implementation. Accordingly, an object of the present invention is to provide a new method that can improve fuel consumption by reducing friction on sliding surfaces from conventional levels without increasing oil consumption from conventional levels, by a method different from the above-described technique.

Solution to Problem

The present inventors studied to solve the above-described problem and confirmed how a friction between a piston and the inner circumferential surface of a cylinder liner varies depending on the position of the piston. Based on the friction change data, the present inventors further studied and found that it is important to control friction at points where torque due to friction is high, rather than simply controlling friction at points where friction is high, in order to reduce friction and improve fuel consumption. Based on this knowledge, the present inventors found that controlling the roughness of the inner circumferential surface of a cylinder liner at a specific location can reduce the friction of the sliding surface from conventional levels and improve fuel efficiency without increasing oil consumption from conventional levels, thereby completing the present invention.

Specifically, one embodiment of the present invention is a cylinder liner and a cylinder bore used in an internal combustion engine, wherein the inner circumferential surface of the cylinder liner or the cylinder bore is formed with a plurality of grooves, the inner circumferential surface of the cylinder liner or the cylinder bore has a first sliding region, a second sliding region, and a third sliding region with different properties of the grooves in the piston sliding direction, the first sliding region, the second sliding region, and the third sliding region are continuous regions, and the first sliding region is located more toward a combustion chamber than the second sliding region, and the surface roughness Rvk of the first sliding region is from 0.05 μm to 0.3 μm, the surface roughness Rvk of the second sliding region is from 0.4 μm to 1.5 μm, and the surface roughness Rvk of the third sliding region is from 0.15 μm to 0.7 μm.

The boundary between the first sliding region and the second sliding region is preferably located in the sliding range of an oil ring provided on a piston at a crank angle of from 40° to 60°, and the boundary between the second sliding region and the third sliding region is preferably located in the sliding range of the oil ring provided on the piston at a crank angle of from 130° to 150°. The internal combustion engine is preferably an internal combustion engine for diesel engines.

Another embodiment of the present invention is a combination of a piston for an internal combustion engine and a cylinder liner or a cylinder bore, including the above-described cylinder liner or the above-described cylinder bore and a piston with a compression ring and an oil ring, wherein the ratio (P/D) of the total tension P (N) of the compression ring and the oil ring of the piston to the inner diameter D (mm) of the cylinder liner or the cylinder bore is 0.45 N/mm or less.

The ratio (P/D) of the total tension P (N) of the compression ring and the oil ring of the piston to the inner diameter D (mm) of the cylinder liner or the cylinder bore is preferably 0.18 N/mm or more, and the oil ring is preferably a two-piece type oil ring, and the contact width of one side of the oil ring in the cylinder liner axial direction at the contact surface between the outer circumferential surface of the oil ring and the cylinder bore is from 0.07 mm to 0.3 mm. Further preferably, the oil ring has a tapered shape in which at least one of contact shapes of the oil ring and the cylinder bore increases in outer diameter toward the crankcase side, or a barrel shape in which an apex of the barrel is on the crankcase side.

Advantageous Effects of Invention

The present invention can provide a cylinder liner or a cylinder bore that can improve fuel consumption by reducing friction on a sliding surface to a lower level than conventional levels without increasing oil consumption to a higher level than conventional levels. A fuel consumption improvement effect is more outstanding when tensions of piston rings used in combination are in specific ranges, and preferably when contact widths of oil rings and cylinder bores are in specific ranges.

DESCRIPTION OF THE PREFERRED EMBODIMENTS

One embodiment of the present invention is a cylinder liner and a cylinder bore suitably used in an internal combustion engine for diesel engines, wherein the inner circumferential surface of a cylinder of the cylinder liner or the cylinder bore is formed with a plurality of grooves. The inner circumferential surface of the cylinder has a first sliding region, a second sliding region, and a third sliding region with different properties of the grooves in the piston sliding direction. The present embodiment will be described using FIG. 1.

Figure 1:
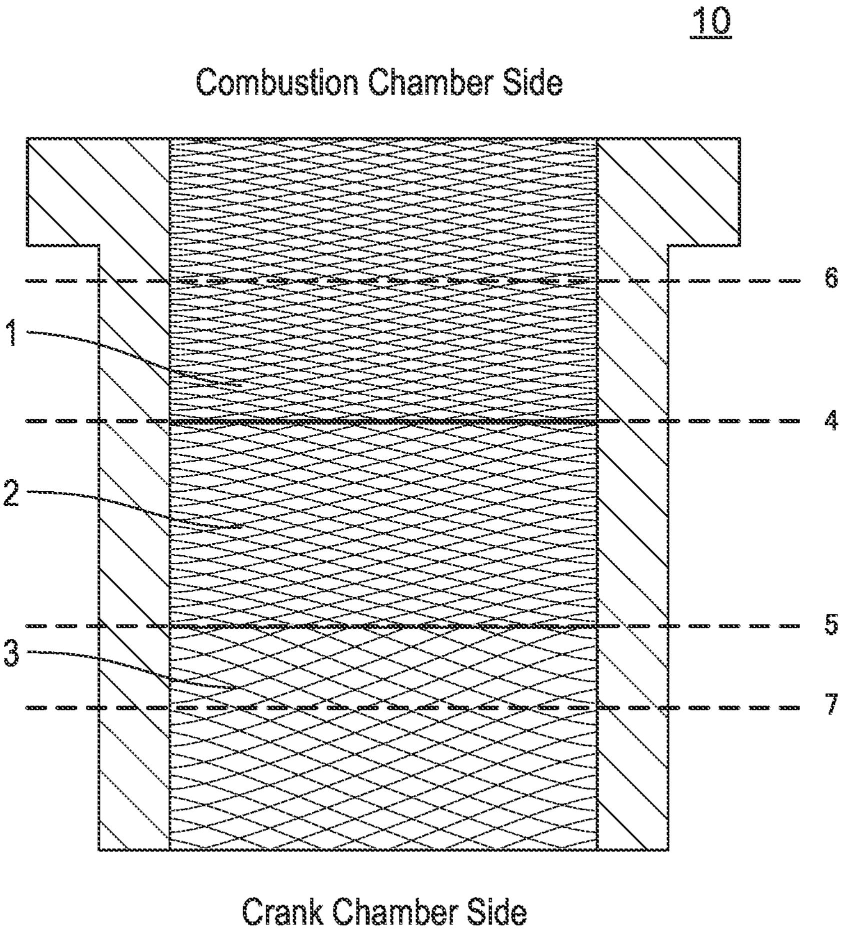
FIG. 1 is a sectional schematic diagram of the cylinder liner of the present embodiment.

FIG. 1 is a sectional diagram of a cylinder liner. A cylinder liner 10 is typically a cast iron cylinder liner, but may also be formed of an aluminum alloy or a copper alloy.

The cylinder liner 10 is placed in a cylinder block of an internal combustion engine, and a piston slides through the cylinder liner in the vertical direction (cylinder liner axial direction) as described in FIG. 1. In FIG. 1, the combustion chamber side is "up" and the crank chamber side is "down".

A chain line 6 in FIG. 1 indicates a top dead center (TDC) of an oil ring, and a chain line 7 indicates a bottom dead center (BDC) of an oil ring, and the inner circumferential surface of a cylinder liner includes a first sliding region 1 including the top dead center 6, a third sliding region 3 including the bottom dead center 7, and a second sliding region 2 positioned in between. The first sliding region 1, the second sliding region 2, and the third sliding region 3 can be contiguous regions via boundaries 4 and 5.

In the present embodiment, the surface roughness Rvk of the first sliding region is from 0.05 μm to 0.3 μm, the surface roughness Rvk of the second sliding region is from 0.4 μm to 1.5 μm, and the surface roughness Rvk of the third sliding region is from 0.15 μm to 0.7 μm.

The present inventors have studied and found that in order to overall reduce the friction between a piston and the inner circumferential surface of a cylinder liner, it is important to reduce the friction at the position where torque due to friction is large, rather than simply to reduce the friction in a region where friction is large, to improve fuel efficiency. In other words, the present inventors have found that in the second sliding region in the present embodiment, by making the surface roughness curve with a roughness shape that has a smaller peak height and a deeper valley depth than other regions, the shear resistance of an oil film in the region can be reduced and friction in the region can be reduced, contributing to overall improvement of fuel efficiency. The boundary of the "region" here is expressed by the angle of rotation of a crank, with the top dead center of an oil ring among piston rings on a piston as a reference (0°).

The inner circumferential surface of the cylinder liner 10 described in FIG. 1 continuously has a first sliding region, a second sliding region, and a third sliding region with different properties of the grooves in the piston sliding direction.

The boundary between the first sliding region and the second sliding region is preferably in a sliding range of an oil ring on a piston at a crank angle of from 40° to 60°, and the boundary between the second sliding region and the third sliding region is preferably in a sliding range of an oil ring on a piston at a crank angle of from 130° to 150°. When the boundary is within the above-described crank angle range, the surface roughness Rvk is reduced in the first sliding region where the cylinder bore wall temperature is high and oil consumption due to oil evaporation is high, resulting in a more outstanding effect of oil consumption reduction, and the surface roughness Rvk is increased in the second sliding region where the torque of friction change is large compared to the surface roughness of the third sliding region Rvk, resulting in an overall reduction in friction between a piston and the cylinder bore and improved fuel consumption. In order to reduce oil consumption, the surface roughness Rvk of the first sliding region is preferably smaller than the surface roughness Rvk of the third sliding region.

The inner circumferential surface of the cylinder liner or the cylinder bore can be produced by changing a honing process between the first sliding region, the second sliding region, and the third sliding region, and by adjusting the number of honing processes, the shape, the type, and the grain size of a grindstone used in the honing process and the like as appropriate.

A cross hatch may be formed on the inner circumferential surface of the cylinder liner or the cylinder bore by a honing process. When forming a cross hatch, the angle (acute angle) is preferably 2° or more, may be 5° or more, and may be 10° or more. The angle is usually 60° or less, may be 45° or less, may be 30° or less, and may be 15° or less.

An example of a machining process of the inner circumferential surface of a cylinder liner in the present embodiment will be described.

After casting a cylinder liner, the inner circumferential surface dimensions are machined to near the finished dimensions in the order of Rough boring, Fine boring, I honing, and II honing. Subsequently, a predetermined surface roughness is formed by honing processes of III honing, IV honing, and V honing.

In I honing, a coarse grindstone is used. The first sliding region is machined by II honing, and a super-finish grindstone is used. The second sliding region is machined by III honing, and a coarse grindstone is used. The third sliding region is machined by IV honing, and a grindstone with medium abrasive grains is used. V honing is machined in such a manner that the first sliding region, the second sliding region, and the third sliding region are continuous regions, using a finish grindstone.

The cases described above indicate cases where the inner circumferential surface of a cylinder liner remains as a base material, and in cases where a chemical conversion treatment such as phosphate coating is applied, a coating process can be added prior to the final machining process of honing.

Depending on constraints of a honing machine's control system, additional processes may be added as appropriate, and alternatively, when a honing machine with a variety of controls is used, the machining process may be omitted.

Even when a cylinder liner is not placed on a cylinder block, a cylinder bore can be machined, in a similar manner to the inner circumferential surface of a cylinder liner.

Another embodiment of the present invention is a combination of a piston for an internal combustion engine and a cylinder liner or a cylinder bore with the cylinder liner or the cylinder bore described above, and a piston with a compression ring and an oil ring. The present embodiment will be described using FIG. 2.

Figure 2:
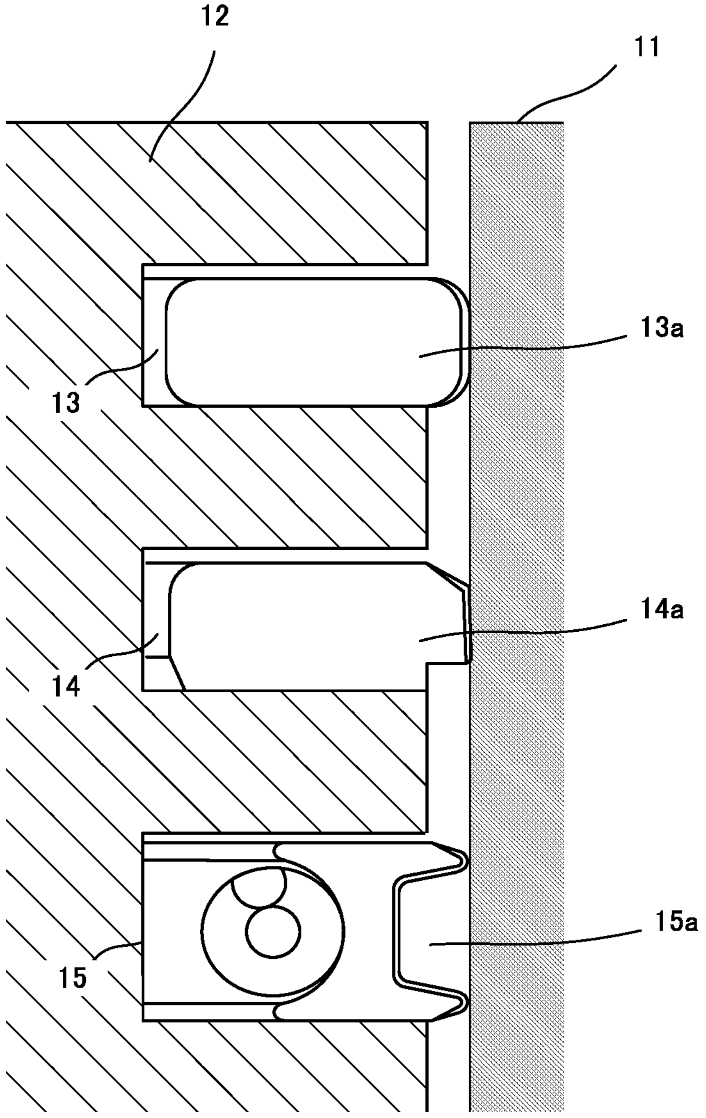
FIG. 2 is a sectional schematic diagram illustrating a combination of a cylinder liner and a piston with a piston ring.

FIG. 2 is a sectional diagram of an example of a combination of a piston with a piston ring and a cylinder liner.

Piston ring grooves are formed on a piston 12, with a first groove 13, a second groove 14, and a third groove 15 from the combustion chamber side. In the first groove 13, a top ring 13*a*, a compression ring, is mounted, in the second groove 14, a second ring 14*a*, a compression ring, is mounted, and in the third groove 15, a combination oil ring 15*a* is mounted.

The right end of the top ring 13*a*, the second ring 14*a*, and the combination oil ring 15*a* described in FIG. 2 is a sliding surface that contacts and slides against the inner wall of the cylinder liner 11, and the outer circumferential surface may be coated with a hard coating.

In the present embodiment, the ratio (P/D) of the total tension P (N) of the compression rings 13*a* and 14*a* and the oil ring 15*a* on the piston to the inner diameter D (mm) of the cylinder liner or cylinder bore is preferably 0.45 N/mm or less. The ratio is preferably 0.18 N/mm or more. A combination of a cylinder liner that meets the above-described range and a piston with a compression ring and an oil ring can further reduce friction between the cylinder liner and the piston rings.

The oil ring 15*a* is preferably a two-piece type oil ring, and in the case of a two-piece type oil ring, the contact width of one side of the oil ring in the cylinder liner axial direction at the contact surface between the outer circumferential surface of the oil ring 15*a* and the cylinder liner 11 is preferably from 0.07 mm to 0.3 mm. A combination of a cylinder liner that meets the above-described contact width range and a piston with a compression ring and an oil ring can further reduce friction between the cylinder liner and the piston rings.

EXAMPLES

The present invention will be described in detail by way of Examples below, but is not limited only to the following Examples.

<Friction Test>

Figure 3:
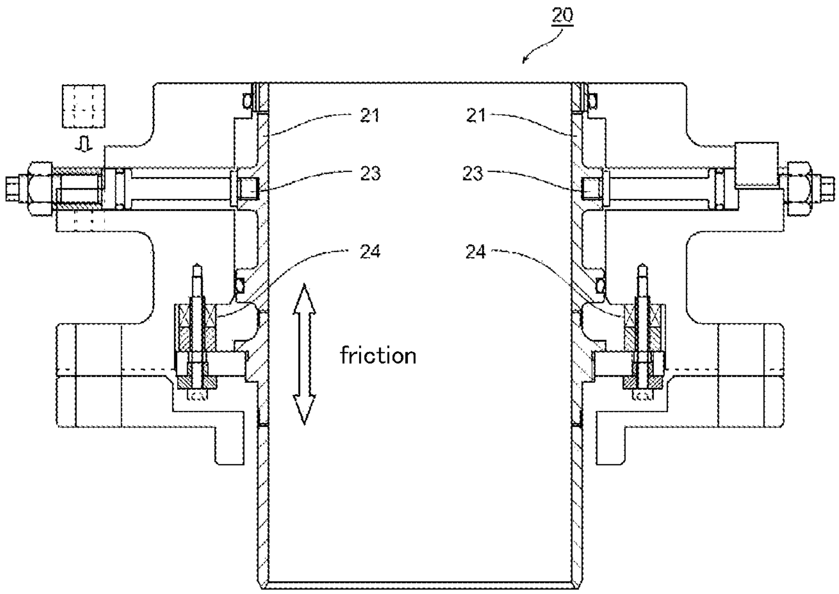
FIG. 3 is a sectional schematic diagram of a testing machine for a friction test performed in Examples.

A friction test was performed in a single-cylinder floating liner tester (a tester that detects friction changes in pistons and piston rings during one cycle) in an open-air motoring evaluation. A crank-type single-cylinder motoring tester (floating liner system) with a bore diameter of 83 mm and a stroke of 86 mm was used for a friction measurement test. FIG. 3 illustrates a sectional schematic diagram of the crank-type single-cylinder motoring tester used for the friction test. A cylinder liner 21 has a structure in which the behavior in the radial direction is limited by a stopper 23 and can move only in the axial direction. A sensor 24 attached to the cylinder liner 21 detects an axial sliding friction force acting on the cylinder liner 21. Evaluation was performed using the friction mean effective pressure (FMEP), which is obtained by dividing the friction torque per cycle of this sliding friction force by displacement volume.

Test conditions used were a cooling water temperature of 80° C. and an engine oil temperature of 80° C., an engine oil of 10W-30 (viscosity classification: SAE J300) was used, and an evaluation rpm between 600 rpm and 2000 rpm was measured.

A cylinder liner with an inner diameter of φ83 mm was prepared using cast iron material. Using this cylinder liner, the piston position and the magnitude of friction torque were measured.

The crank angle and the frictional force of an oil ring at a rotation speed of 1,500 rpm were measured on each tester, with a combination with a cylinder liner in which the ratio of the piston ring total tension to the cylinder liner inner diameter is 0.46 N/mm and the cylinder liner inner circumferential surface roughness is Rvk 1.9 μm on the entire surface being a conventional specification (Comparative Example) and a combination with a cylinder liner in which the piston ring total tension is 0.34 N/mm and the inner circumferential surface roughness of the cylinder liner is Rvk 0.2 μm in the first sliding region, Rvk 0.5 μm in the third sliding region, and Rvk 0.8 μm in the second sliding region being the present invention (Example). The results are illustrated in FIG. 4.

Figure 5:
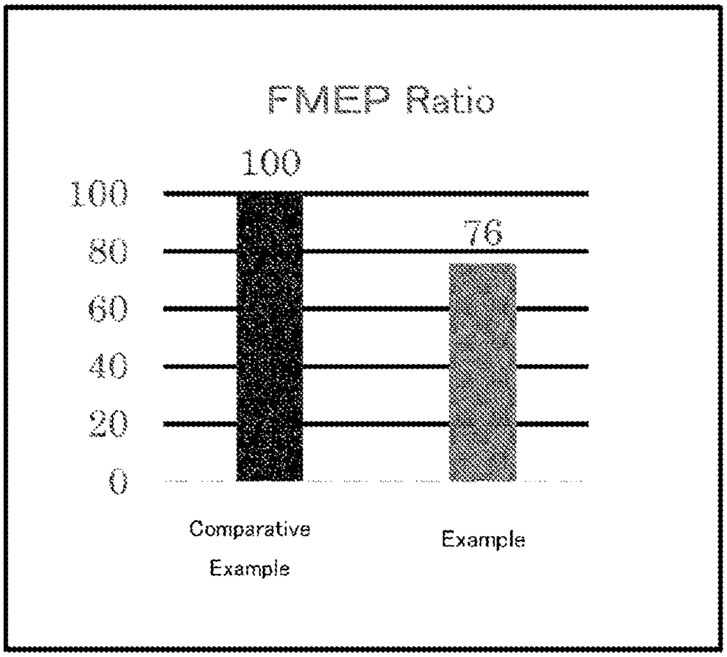
FIG. 5 is a graph showing results of a friction test conducted in Examples.

The FMEP ratio of the present invention (Examples) is illustrated in FIG. 5 when the conventional specification (Comparative Example) is set at 100 at a test machine rotation speed of 2,000 rpm.

Figure 4:
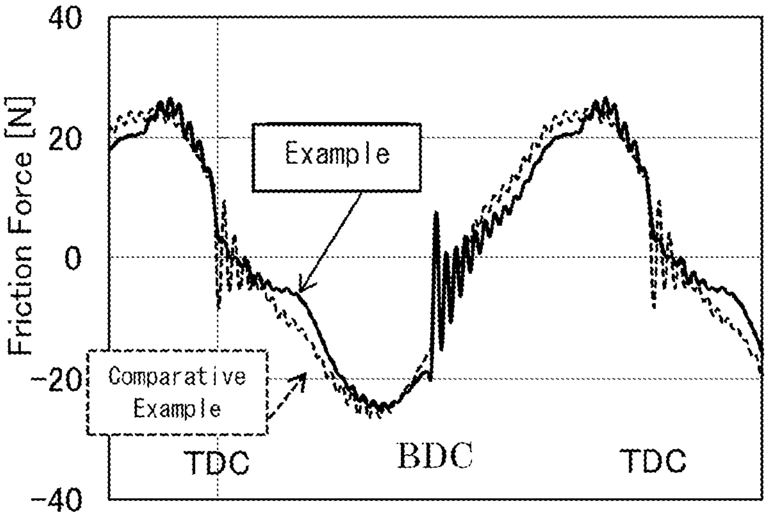
FIG. 4 is a graph showing results of a friction test conducted in Examples.

From FIG. 4, it can be understood that a friction force is reduced when the surface roughness Rvk of the second sliding region (in the range of from about 40° to about 150° in crank angle of an oil ring) is set at 0.8 μm, compared with a surface roughness Rvk of 1.9 μm over the entire region.

From FIG. 5, it can be understood that the present invention reduces FMEP by more than 20% at a rotation speed of 2,000 rpm in a tester compared to a conventional specification.

From these results, the present inventors arrived at an idea that reducing friction in this region would have a considerable effect on improving fuel efficiency.

<FMEP Ratio Evaluation by Surface Roughness Rvk>

Next, the inner circumferential surface roughness of the cylinder liner was changed from 0.04 μm to 0.4 μm for the surface roughness Rvk of the first sliding region, from 0.3 μm to 1.7 μm for the second sliding region, and from 0.1 μm to 0.8 μm for the third sliding region, and the FMEP of each was measured. The results are shown in Table 1.

The results for the first sliding region, the second sliding region and the third sliding region with Rvk 0.2 μm and Rvk 1.9 μm are also shown in Table 1.

A combination of a cylinder liner with a ratio of piston ring total tension to cylinder liner inner diameter of 0.46 N/mm and a cylinder liner inner circumferential surface roughness of Rvk 1.9 μm on the entire surface was used as a conventional specification, and the FMEP at that time was set as 100%, and various types of piston ring total tension and cylinder liner inner circumferential surface properties were tested, and the FMEP was evaluated as S for a reduction of 20% or more, A for a reduction of 10% or more but less than 20%, B for a reduction of more than 0% but less than 10%, and C for an equivalent or less reduction.

<Residual Oil Quantity Evaluation Test>

Figure 6:
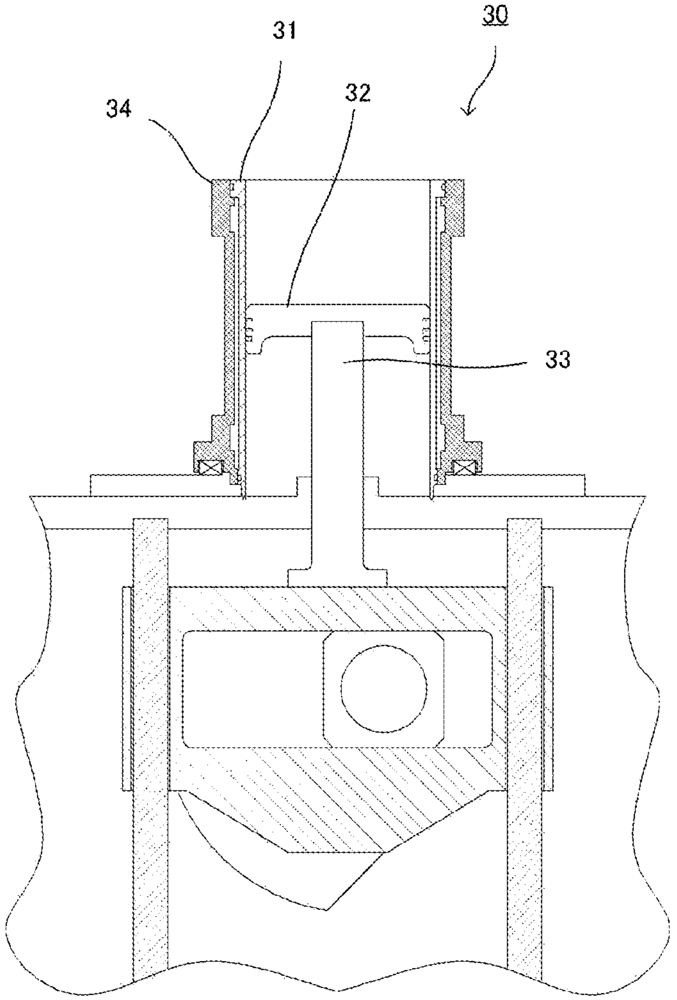
FIG. 6 is a sectional schematic diagram of a testing machine for a residual oil quantity evaluation test conducted in Examples.

A scotch-yoke type friction tester with a bore×stroke of ø83×86 mm inside diameter was used for a residual oil quantity evaluation tester. Engine oil with SAE viscosity of 0W-20 was used as a lubricant, and the oil temperature was set at 80° C. After 30 s of operation at 1,000 rpm, a piston was stopped at the bottom dead center position and the oil left on the cylinder liner wall was wiped off with a filter paper, and the weight change of the filter paper before and after the wiping was measured with an electronic balance. FIG. 6 illustrates a sectional schematic diagram of the scotch-yoke type friction tester used in the residual oil quantity evaluation test. A scotch-yoke type friction tester 30 has a cylinder liner 31, a piston 32, a connecting rod 33, and a retaining member 34. The piston 32 is equipped with a top ring, a second ring, and an oil ring.

The inner circumferential surface roughness of the cylinder liner was changed from 0.04 μm to 0.4 μm for the surface roughness Rvk of the first sliding region, from 0.3 μm to 1.7 μm for the surface roughness Rvk of the second sliding region, and from 0.1 μm to 0.8 μm for the surface roughness Rvk of the third sliding region, and the respective residual oil quantities were measured. The results are shown in Table 1. The "total tension/Cyl" in Table 1 is the ratio of the piston ring total tension to the inner diameter of the cylinder liner.

A combination of a cylinder liner with a ratio of piston ring total tension to cylinder liner inner diameter of 0.45 N/mm and a cylinder liner inner circumferential surface roughness of Rvk 1.9 μm on the entire surface was used as a conventional specification, and the residual oil quantity at that time was set as 100%, and various types of piston ring total tension and cylinder liner inner circumferential surface properties were tested, and the residual oil quantity was evaluated as S for a reduction of 20% or more, A for a reduction of 10% or more but less than 20%, B for a reduction of more than 0% but less than 10%, and C for an equivalent or less reduction.

TABLE 1

| | Total Tension/Cyl N/mm | Roughness First Sliding Region | Roughness Second Sliding Region RvK | Roughness Third Sliding Region | FMEP Ratio | Residual Oil Quantity Ratio |
|---|---|---|---|---|---|---|
| Example 1 | 0.18 | 0.05 | 0.4 | 0.15 | A | A |
| Example 2 | 0.25 | 0.3 | 1.5 | 0.7 | A | A |
| Example 3 | 0.34 | 0.2 | 0.8 | 0.3 | S | S |
| Example 4 | 0.2 | 0.2 | 0.8 | 0.5 | S | A |
| Example 5 | 0.34 | 0.2 | 0.4 | 0.5 | A | S |
| Example 6 | 0.34 | 0.2 | 0.5 | 0.5 | S | S |
| Example 7 | 0.34 | 0.2 | 0.8 | 0.5 | S | S |
| Example 8 | 0.34 | 0.2 | 1.2 | 0.5 | S | S |
| Example 9 | 0.34 | 0.2 | 1.5 | 0.5 | A | S |
| Example 10 | 0.45 | 0.2 | 0.8 | 0.5 | A | S |
| Example 11 | 0.55 | 0.3 | 1.5 | 0.7 | B | A |
| Comparative Example 1 (BM) | 0.46 | | 1.9 | | — | — |
| Comparative Example 2 | 0.3 | | 0.2 | | C | S |
| Comparative Example 3 | 0.45 | 0.04 | 0.3 | 0.1 | C | S |

TABLE 1-continued

| | Total Tension/Cyl N/mm | Roughness First Sliding Region | Roughness Second Sliding Region RvK | Roughness Third Sliding Region | FMEP Ratio | Residual Oil Quantity Ratio |
|---|---|---|---|---|---|---|
| Comparative Example 4 | 0.34 | 0.4 | 1.7 | 0.8 | B | B |
| Comparative Example 5 | 0.16 | 0.4 | 1.7 | 0.8 | S | C |

<Combination with Piston Ring>

Of the piston rings used in the combination, the top ring had a width (axial dimension of the cylinder 1) of 1.2 mm, a barrel-shaped outer circumferential surface, and a base material equivalent to JIS SUS440B, with a CrN coating on the outer circumferential surface by the arc ion plating method. The ratio of top ring tension to cylinder liner inner diameter was 0.07 (N/mm).

The second ring had a width (axial dimension of the cylinder 1) of 1.2 mm, a tapered outer circumferential surface, and a base material equivalent to FC250 with hard Cr plating on the outer circumferential surface. The cylinder liner inner diameter ratio of the second ring tension was 0.05 (N/mm).

The combination oil ring had a combination width h of 2.0 mm, and the base material was JIS SUS420J2 equivalent material with a nitrided outer circumferential surface. The ratio of oil ring tension to cylinder liner inner diameter was 0.17 (N/mm). The contact width of one side of the oil ring was 0.1 mm, and the contact width on the opposite side was also 0.1 mm.

REFERENCE SIGNS LIST

10 Cylinder liner
1 First sliding region
2 Second sliding region
3 Third sliding region
4 Boundary
5 Boundary
6 Top dead center
7 Bottom dead center
11 Cylinder liner
12 Piston
13 First groove
14 Second groove
15 Third groove
**13*a*** Top ring
**14*a*** Second ring
**15*a*** Oil ring
20 Crank-type single cylinder motoring tester
21 Cylinder liner
23 Stopper
24 Sensor
30 Scotch-yoke type friction tester
31 Cylinder liner
32 Piston
33 Connecting rod
34 Retaining member

The invention claimed is:

1. A cylinder liner used in an internal combustion engine wherein:

an inner circumferential surface of the cylinder liner is formed with a plurality of cross hatches, wherein an angle of the cross hatches is 2° or more and 60° or less, the inner circumferential surface of the cylinder liner has a first sliding region, a second sliding region, and a third sliding region with different properties of the grooves in a piston sliding direction, the first sliding region, the second sliding region, and the third sliding region are continuous regions, and the first sliding region is located more toward a combustion chamber than the second sliding region, a surface roughness Rvk of the first sliding region is from 0.05 μm to 0.3 μm, a surface roughness Rvk of the second sliding region is from 0.4 μm to 1.5 μm, and a surface roughness Rvk of the third sliding region is from 0.15 μm to 0.7 μm, and the surface roughness Rvk of the first sliding region is smaller than the surface roughness Rvk of the third sliding region, and the surface roughness Rvk of the second sliding region is greater than the surface roughness of the first sliding region.

2. The cylinder liner according to claim 1, wherein a boundary between the first sliding region and the second sliding region is located in a sliding range of an oil ring provided on a piston at a crank angle of from 40° to 60°.

3. The cylinder liner according to claim 1, wherein a boundary between the second sliding region and the third sliding region is located in a sliding range of an oil ring provided on a piston at a crank angle of from 130° to 150°.

4. The cylinder liner according to claim 1, wherein the internal combustion engine is a diesel internal combustion engine.

5. The cylinder bore according to claim 1, wherein a boundary between the second sliding region and the third sliding region is located in a sliding range of an oil ring provided on a piston at a crank angle of from 130° to 150°.

6. The cylinder liner according to claim 1, wherein the surface roughness Rvk of the first sliding region is from 0.05 μm to 0.2 μm, and/or the surface roughness Rvk of the second sliding region is from 0.5 μm to 1.5 μm, and/or the surface roughness Rvk of the third sliding region is from 0.3 μm to 0.7 μm.

7. A combination of a piston for an internal combustion engine and a cylinder liner or a cylinder bore, including the cylinder liner according to claim 1 and a piston with a compression ring and an oil ring, wherein a ratio (P/D) of a total tension P (N) of the compression ring and the oil ring of the piston to an inner diameter D (mm) of the cylinder liner or the cylinder bore is 0.45 N/mm or less.

8. The combination according to claim 7, wherein the ratio (P/D) of the total tension P (N) of the compression ring and the oil ring of the piston to the inner diameter D (mm) of the cylinder liner or the cylinder bore is 0.18 N/mm or more.

9. The combination according to claim 7, wherein the oil ring is a two-piece type oil ring, and a contact width of one side of the oil ring in a cylinder liner or cylinder bore axial direction at a contact surface between an outer circumferential surface of the oil ring and the cylinder liner or cylinder bore is from 0.07 mm to 0.3 mm.

10. The combination according to claim 7, wherein the surface roughness Rvk of the first sliding region is from 0.05 μm to 0.2 μm, and/or the surface roughness Rvk of the second sliding region is from 0.5 μm to 1.5 μm, and/or the surface roughness Rvk of the third sliding region is from 0.3 μm to 0.7 μm.

11. A cylinder bore used in an internal combustion engine, wherein:

an inner circumferential surface of the cylinder bore is formed with a plurality of cross hatches, wherein an angle of the cross hatches is 2° or more and 60° or less, the inner circumferential surface of the cylinder bore has a first sliding region, a second sliding region, and a third sliding region with different properties of the grooves in a piston sliding direction, the first sliding region, the second sliding region, and the third sliding region are continuous regions, and the first sliding region is located more toward a combustion chamber than the second sliding region, a surface roughness Rvk of the first sliding region is from 0.05 μm to 0.3 μm, a surface roughness Rvk of the second sliding region is from 0.4 μm to 1.5 μm, and a surface roughness Rvk of the third sliding region is from 0.15 μm to 0.7 μm, and the surface roughness Rvk of the first sliding region is smaller than the surface roughness Rvk of the third sliding region, and the surface roughness Rvk of the second sliding region is greater than the surface roughness of the first sliding region.

12. The cylinder bore according to claim 11, wherein a boundary between the first sliding region and the second sliding region is located in a sliding range of an oil ring provided on a piston at a crank angle of from 40° to 60°.

13. The cylinder bore according to claim 11, wherein the internal combustion engine is a diesel internal combustion engine.

14. The cylinder bore according to claim 11, wherein the surface roughness Rvk of the first sliding region is from 0.05 μm to 0.2 μm, and/or the surface roughness Rvk of the second sliding region is from 0.5 μm to 1.5 μm, and/or the surface roughness Rvk of the third sliding region is from 0.3 μm to 0.7 μm.

15. A combination of a piston for an internal combustion engine and a cylinder liner or a cylinder bore, including the cylinder bore according to claim 11 and a piston with a compression ring and an oil ring, wherein a ratio (P/D) of a total tension P (N) of the compression ring and the oil ring of the piston to an inner diameter D (mm) of the cylinder liner or the cylinder bore is 0.45 N/mm or less.

16. The combination according to claim 15, wherein the ratio (P/D) of the total tension P (N) of the compression ring and the oil ring of the piston to an inner diameter D (mm) of the cylinder liner or the cylinder bore is 0.18 N/mm or more.

17. The combination according to claim 15, wherein the oil ring is a two-piece type oil ring, and a contact width of one side of the oil ring in a cylinder liner or cylinder bore axial direction at a contact surface between an outer circumferential surface of the oil ring and the cylinder liner or cylinder bore is from 0.07 mm to 0.3 mm.

18. The combination according to claim 15, wherein the surface roughness Rvk of the first sliding region is from 0.05 μm to 0.2 μm, and/or the surface roughness Rvk of the second sliding region is from 0.5 μm to 1.5 μm, and/or the surface roughness Rvk of the third sliding region is from 0.3 μm to 0.7 μm.

* * * * *